United States Patent
Rickert et al.

(10) Patent No.: US 7,571,592 B2
(45) Date of Patent: Aug. 11, 2009

(54) MACHINE FOR MOWING STALK-LIKE CROP

(75) Inventors: Clemens Rickert, Ahaus (DE); Martin Hüning, Billerbeck (DE); Leo Schulze Hockenbeck, Everswinkel (DE); Klemens Weitenberg, Borken (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 0 days.

(21) Appl. No.: 12/015,823

(22) Filed: Jan. 17, 2008

(65) Prior Publication Data
US 2008/0172999 A1    Jul. 24, 2008

(30) Foreign Application Priority Data
Jan. 18, 2007    (DE)    ............. 10 2007 002 659

(51) Int. Cl.
*A01D 45/02*    (2006.01)
(52) U.S. Cl. .......................... 56/51; 56/157
(58) Field of Classification Search ............ 56/51, 56/94, 102, 57, 6, 53, 62, 109, 119, 153, 56/157
See application file for complete search history.

(56) References Cited
U.S. PATENT DOCUMENTS

| | | | | |
|---|---|---|---|---|
| 4,594,842 A * | 6/1986 | Wolters et al. | ........... | 56/94 |
| 5,237,804 A * | 8/1993 | Bertling | ........... | 56/60 |
| 5,722,225 A * | 3/1998 | Wuebbels et al. | ........... | 56/60 |
| 6,658,832 B2 * | 12/2003 | Wubbels et al. | ........... | 56/94 |
| 6,701,702 B2 * | 3/2004 | Wubbels | ........... | 56/103 |
| 6,775,967 B2 * | 8/2004 | Wubbels | ........... | 56/60 |
| 6,782,682 B2 * | 8/2004 | Steppat | ........... | 56/119 |
| 6,826,897 B2 * | 12/2004 | Wubbels | ........... | 56/51 |
| 7,010,903 B2 * | 3/2006 | Bruening | ........... | 56/51 |
| 2002/0134064 A1 * | 9/2002 | Wubbels et al. | ........... | 56/94 |
| 2003/0079457 A1 * | 5/2003 | Wubbels | ........... | 56/52 |
| 2003/0084654 A1 * | 5/2003 | Wubbels | ........... | 56/51 |
| 2004/0123576 A1 * | 7/2004 | Bruening | ........... | 56/51 |
| 2005/0005589 A1 * | 1/2005 | Bruening et al. | ........... | 56/51 |
| 2005/0097876 A1 * | 5/2005 | Bruening et al. | ........... | 56/51 |
| 2005/0132688 A1 * | 6/2005 | Resing | ........... | 56/51 |

FOREIGN PATENT DOCUMENTS
DE    3226876    1/1984

(Continued)

OTHER PUBLICATIONS
European Search Report, Apr. 3, 2008, 4 Pages.

*Primary Examiner*—Robert E Pezzuto
*Assistant Examiner*—Joan D Misa

(57) ABSTRACT

A machine is provided for harvesting stalk-like crop, with a frame, to which in each case at least three mowing and intake arrangements are attached of which the first mowing and intake arrangement that is directly adjoining the longitudinal center plane of the machine and can be driven in such a way that their forward regions of the machine, as seen in the forward operating direction, move towards the outside. The second mowing and intake arrangements, that follow the first mowing and intake arrangement to the outside move in the opposite direction to the first mowing and intake arrangements. The third mowing and intake arrangements, which follow the second mowing and intake arrangements to the outside, are driven in the same direction as the first mowing and intake arrangements.

9 Claims, 3 Drawing Sheets

FOREIGN PATENT DOCUMENTS

| | | |
|---|---|---|
| DE | 202005005700 | 8/2005 |
| DE | 102005004004 | 8/2006 |
| EP | 0760200 | 3/1997 |
| EP | 1464215 | 10/2004 |
| EP | 1862057 | 12/2007 |

* cited by examiner

MACHINE FOR MOWING STALK-LIKE CROP

FIELD OF THE INVENTION

The invention concerns a machine for harvesting stalk-like crop, with a frame that can be moved in a forward direction across a field, and to which at least three mowing and intake arrangements are attached to either side of a longitudinal center plane of which the first mowing and intake arrangements that are adjacent to the longitudinal center plane can be driven during the harvesting operation in such a way that their forward regions, as seen in the forward operating direction of the machine, move in the outward direction, and that the second mowing and intake arrangements that follow the first mowing and intake arrangements to the outside can be driven in such a way that their forward regions, as seen in the forward operating direction, move in the inward direction during the harvesting operation, so that the flows of harvested crop from the first and second mowing and intake arrangements in each case converge and can be delivered to a self-propelled forage harvester and that the third mowing and intake arrangements that follow the second mowing and intake arrangements to the outside are attached in such a way that they deliver the harvested crop taken up by them directly to the second mowing and intake arrangements during the harvesting operation.

BACKGROUND OF THE INVENTION

Machines of the kind cited initially are mused in agriculture, in order to cut stalk-like crop, for example corn plants, from the ground of the field and to conduct them to a forage harvester that carries the machine and in which the plants are chopped and delivered to a self-loading forage box on a trailer. As a rule such machines are provided with a number of mowing and intake arrangements arranged alongside each other that operate independently of rows, these are configured in the form of drums rotating about the vertical axis with recesses distributed about their edges in which the stalks of the plants can be accommodated and mowing disks arranged underneath the drums that are used to cut the stalks of the plants from the ground.

Embodiments are also known with movable conveying chains for the transport of plants. DE 10 2005 004 004 A describes such a machine, that is provided with a total of four chain conveyors, that convey the harvested crop to the center of the machine along their forward sides, from where it is deflected to the rear and conveyed into the intake channel of a forage harvester that carries the machine and moves it across the field.

DE 20 2005 005 700 U1 describes a machine of the kind described initially. The first mowing and intake arrangements adjoining the longitudinal center plane rotate outward with their front sides. The second mowing and intake arrangements that follow to the outside rotate in the opposite direction. In their rear regions the first mowing and intake arrangements transport all the plants taken up by their half of the machine in their rear regions and deliver them to the intake channel of the forage harvester. The third mowing and intake arrangements following in turn to the outside rotate in the same direction as the second mowing and intake arrangements. The plants taken up by the third mowing and intake arrangement are delivered directly to the second mowing and intake arrangement, that is, without any further active conveying devices.

A different machine for the harvesting of stalk-like plants is described by DE 32 26 876 A. In an embodiment four mowing and intake arrangements are provided, of which the first mowing and intake arrangements adjacent to the longitudinal center plane are driven in such a way that they rotate with their forward sides towards the center of the machine and then deliver the harvested crop to the rear into the intake channel of the forage harvester. The second, outer mowing and intake arrangements rotate in the opposite direction to the first mowing and intake arrangements and initially convey the harvested crop along their rear sides, before they deliver it to the first mowing and intake arrangements.

In the case of the machine, according to DE 20 2005 005 700 U1, it is seen as a disadvantage that the plants are subjected to abrupt changes in direction and velocity in the transition region to the second mowing and intake arrangements since they are moved at first to the rear by the third mowing and intake arrangements and then to the front by the second mowing and intake arrangements. This leads to problems with the transfer which the document cited attempts to overcome by costly deflection and guide elements that are intended to support the transfer of the harvested crop functionally.

Since DE 32 26 876 A teaches that the harvested crop is to be guided in the same direction from the front into the intake rolls, anyone skilled in the art would maintain the direction of rotation of the four mowing and intake arrangements described there upon an enlargement of the machine described by DE 32 26 876 A to a larger number of mowing and intake arrangements and add a third mowing and intake arrangement in each case at the outside that, in turn, rotates in the opposite direction to the second mowing and intake arrangement. This would have the disadvantage that the first mowing and intake arrangements (that are immediately adjacent to the longitudinal center plane of the machine) would have to cope with the entire flow of harvested crop of the associated half of the machine at its forward side, this is seen as problematic.

SUMMARY OF THE INVENTION

The purpose underlying the invention is seen in the need to create a machine for the mowing of stalk-like crop with greater operating width that is distinguished by a simple configuration and secure conveying of the harvested crop.

The machine includes a frame, that can be moved across a field in a forward operating direction, for which purpose it can be mounted on a self-propelled forage harvester. The frame supports at least six mowing and intake arrangements of which in each case three are arranged on each side of the longitudinal center plane of the machine which is symmetrical about the longitudinal center plane. The first mowing and intake arrangements that are adjacent to the longitudinal center plane are driven during the harvesting operation in such a way that their forward sides move in the outward direction, while the second mowing and intake arrangements that follow to the outside rotate in the opposite direction to these during the harvesting operation. The flows of harvested crop from the first mowing and intake arrangements and the second mowing and intake arrangements converge in the area between them and are delivered to the intake channel of a forage harvester to the rear of the first mowing and intake arrangements. For this purpose the flow of harvested crop can be actively conveyed by the rear sides of the first mowing and intake arrangements and/or by separate delivery conveyors. The third mowing and intake arrangements that follow the second mowing and intake arrangements towards the outside move during the harvesting operation in the same direction as the first mowing and intake arrangements and therefore move to the outside with their forward regions as seen in the forward operating direction of the machine. The plants are then conveyed to the rear and inwardly in the direction of the longitudinal center plane of the machine and delivered to the second mowing and intake arrangements in their convergent regions without interposition of any active conveyors. In this way the result is a machine for harvesting stalk-like harvested crop that makes possible an optimum flow of harvested crop without any abrupt changes in direction and with relatively large operating widths. In case that fourth or fifth mowing and intake arrangements are to be added, these would rotate in the same direction as the second or first mowing and intake arrangements respectively.

In a preferred embodiment the first, second and third mowing and intake arrangements include, in a manner known in itself, in each case lower cutting disks for cutting the stalks of the plants from stubble remaining in the ground and rotating conveyor disks arranged coaxially above these with recesses distributed around their circumferences that accommodate the stalks of plants. It would also be conceivable to use mowing and intake arrangements with movable conveyor chains for the transport of the plants.

In another possible embodiment the first and second mowing and intake arrangements are provided with a larger diameter (for example, 1.5 meters for the harvest of two rows planted with a spacing of 0.75 meters) than the third mowing and intake arrangements (for example, 0.75 meter for the harvest of a row planted with a spacing of 0.75 meters). The axes of rotation of the mowing and intake arrangements may lie in a straight line. But it would also be conceivable that all of the mowing and intake arrangements of the machine are provided with the same diameter that may be 1.5 meters or 0.75 meters.

The third mowing and intake arrangements, that form the outer edge of the machine, may be associated with outer stalk lifting screw conveyors as leaf lifters. The direction of conveying of the stalk lifting screw conveyors, that is directed to the rear, corresponds to the direction of conveying of the third mowing and intake arrangement which adjoins it, this improves the conveying effect. Alternatively they adjoin outer divider points which are rigidly connected to the frame. Transverse conveying drums can also be arranged at the rear region of the third mowing and intake arrangements, these drums, in particular, are equipped with drivers that extend through slots in the rear wall of the frame.

DESCRIPTION OF THE PREFERRED EMBODIMENT

Figure 1:
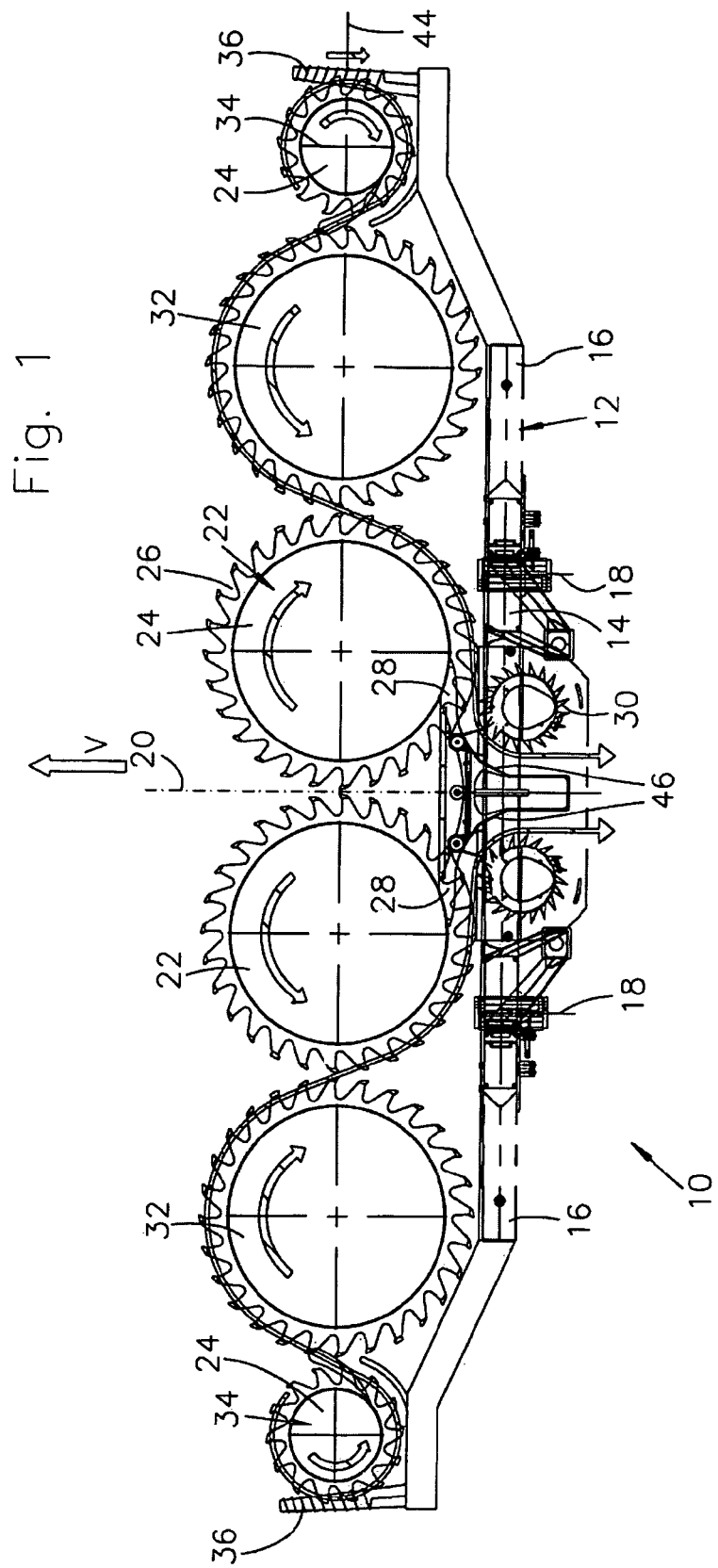
FIG. 1 shows a plan view of a first embodiment of a machine, according to the invention, for the harvest of stalk-like crop.

FIG. 1 shows a schematic plan view of a machine 10 for the harvest of stalk-like crop, particularly corn. The machine 10 is fastened to the intake channel of a self-propelled forage harvester, not shown in FIG. 1, this intake channel is equipped with pre-pressing rolls and the machine is moved across a field that is to be harvested by the forage harvester in an operating direction V. In the following the indications of direction, such as front and rear refer to the forward operating direction V.

The machine 10 includes a frame 12 with a central transverse carrier 14, supported on the intake channel, to which outer transverse carriers 16 are connected in joints so that it can be pivoted upward about horizontal pivot axes 18 extending in the forward operating direction, in which the outer transverse carrier 16 is pivoted upward through approximately 90 degrees by actuators, not shown, in order to bring the machine 10 into a folded transport condition for operation on public roads.

The machine 10 is configured symmetrically about the longitudinal center plane 20. Two first mowing and intake arrangements 22 are immediately adjacent to the longitudinal center plane 20, these include, in a manner known in itself, a rotating lower cutting disk (not shown) and rotating upper conveying disks 24 arranged coaxially above these with recesses 26 distributed about their circumference that accommodate plant stalks. The mowing and intake arrangements 22 are driven by associated gearboxes (not shown), are supported on the center transverse carrier 14, and are driven from the forage harvester by an appropriate drive-line (not shown). During the harvesting operation the conveyor disks 24 of the first mowing and intake arrangements 22 rotate in the directions indicated by the arrows, that is, outward with their forward sides. Strippers 28 are arranged on the rear sides of the first mowing and intake arrangements 22 that lift the stalks of the plants out of the recesses 26. Delivery conveyor drums 30 with vertical axes of rotation or axes of rotation inclined slightly in the forward direction take over the plants and convey them to the rear into the intake channel where they are supported by central guide walls 46 that follow directly upon the strippers 28.

The first mowing and intake arrangements 22 are followed in the sideways direction by second mowing and intake arrangements 32 that are identical in their configuration with the first mowing and intake arrangements 22, their conveyor disks 24 forward sides, however, rotate in the opposite direction to the conveyor disks 24 of the first mowing and intake arrangement 22 and through which the driving gearboxes, not shown, are supported on the outer transverse carrier 16. Appropriate strippers, not shown, are used to assure that the second mowing and intake arrangements 32 deliver the plants conveyed by them into the convergent region with the first mowing and intake arrangements 22.

Third mowing and intake arrangements 34 follow the second mowing and intake arrangements 32 in the sideways direction. They are supported by the driving gearboxes, not shown, on the outer transverse carrier 16, exhibit with a diameter of approximately 0.75 meters approximately half the diameter of the first and the second mowing and intake arrangements 22, 32 which amounts to approximately 1.5 meters and their conveying disks 24 rotate during the harvesting operation in the opposite direction to that of the second mowing and intake arrangements 32, that is, they rotate with their forward sides at first in the outward direction and then convey the plants along their rear sides until they are lifted out of the recesses of the conveyor disks 24 of the third mowing and intake arrangement 34 and are delivered directly without any intervening active conveying devices, to the second mowing and intake arrangements 32, which then carry it along on their forward sides and deliver them to the first mowing and intake arrangements 22. The axes of rotation of all mowing and intake arrangements 22, 32 lie along a line 44 extending transverse to the forward operating direction V and to the longitudinal center plane 20 extending parallel to it. The center of the third mowing and intake arrangements 34 may also be located further forward than that of the first and second mowing and intake arrangements 22, 32. The advantage here would be a reduction in the length of the path of the harvested crop.

In the embodiment according to FIG. 1, stalk lifting screw conveyors 36 are attached to the outer sides of the machine immediately adjacent to the third mowing and intake arrangement 34 in order to be able to take up lodged corn if necessary. The stalk lifting screw conveyors 36 convey the plants to the rear and are supported therein by the adjoining regions of the third mowing and take up arrangements.

Figure 2:
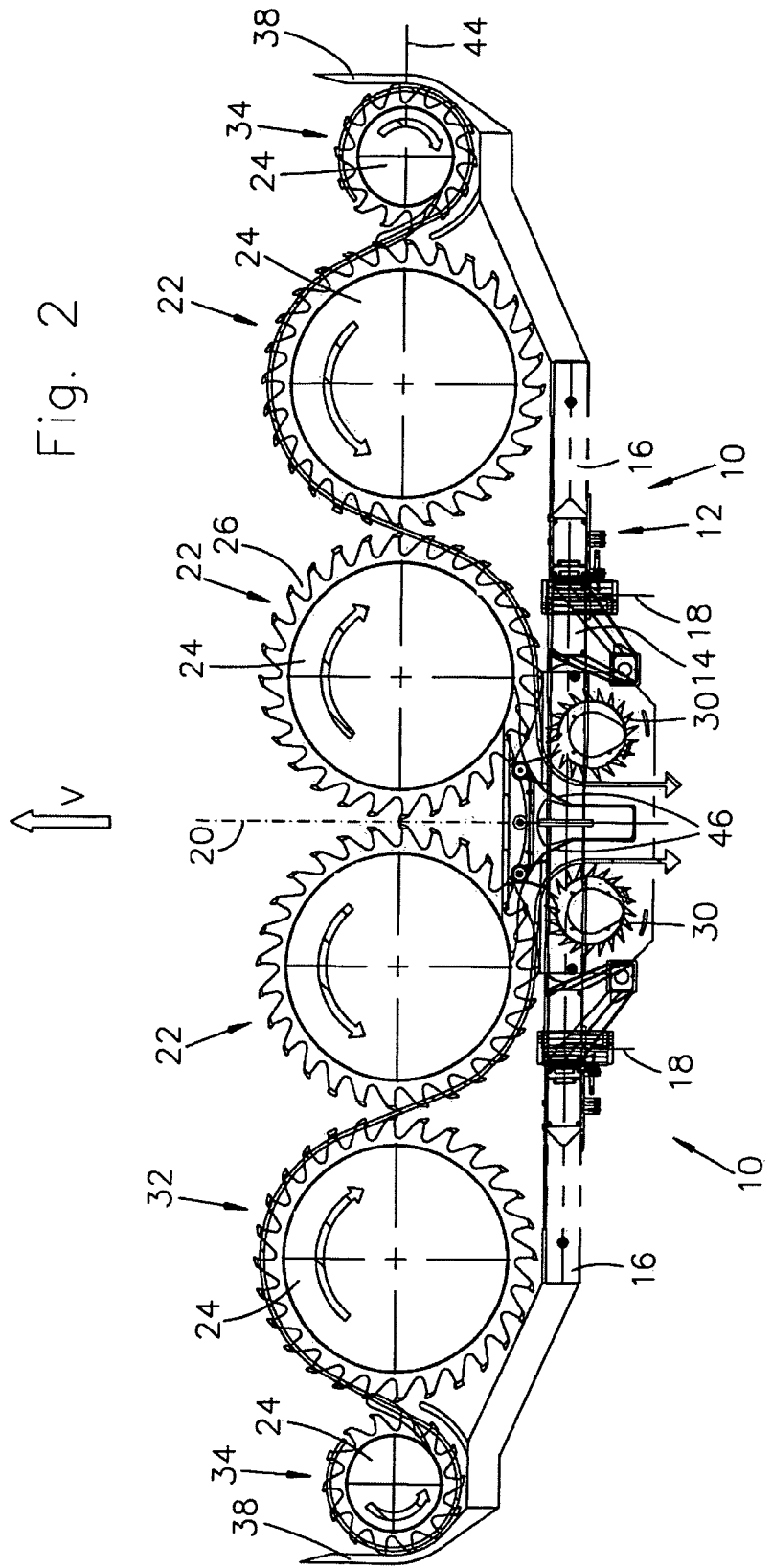
FIG. 2 shows a plan view of a second embodiment of a machine, according to the invention, for the harvest of stalk-like crop.
Figure 3:
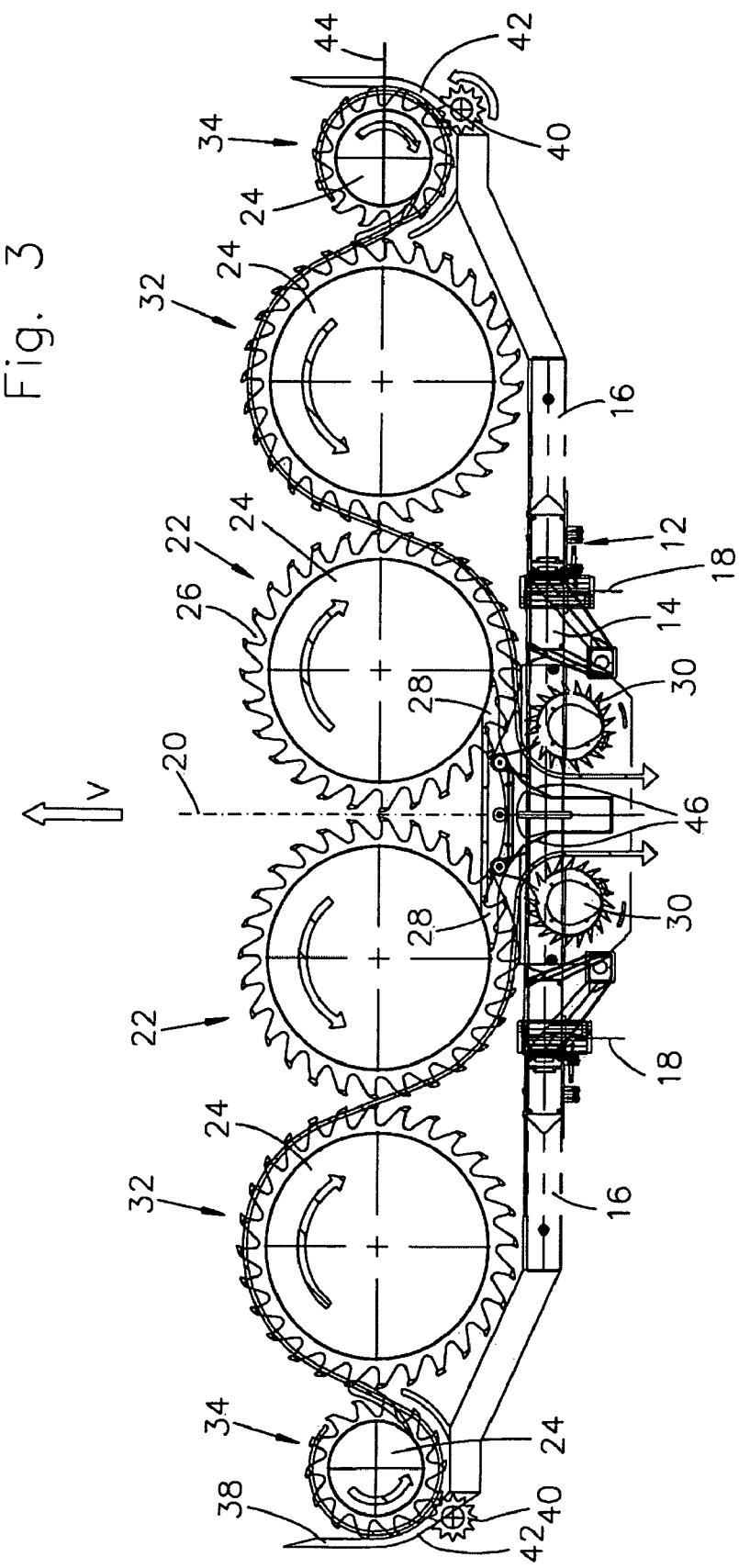
FIG. 3 shows a plan view of a third embodiment of a machine, according to the invention, for the harvest of stalk-like crop.

In the embodiment according to FIG. 2 divider points 38 are provided in place of the stalk lifting screw conveyors 36, these are rigidly connected to the outer transverse carrier 16 of the frame 12.

Finally, transverse conveyor drums 40 are arranged on the rear wall of the outer transverse carrier 16 of the frame 12, which are driven in the direction of the arrow and include drivers that extend through slots provided in the rear wall 42 of the frame 12. The wall 42 is located above the outer transverse carrier 16 and to the rear of the third mowing and intake arrangement 34, it is followed to the front by the divider point 38.

On the basis of this configuration the operation of the machine 10 is such that the machine 10 is moved across a field in the forward operating direction V by a forage harvester and the mowing and intake arrangements 22, 32, 34, the delivery conveyor drums 30 and, if necessary, the stalk lifting screw conveyors 36 and the transverse conveyor drums 40 are driven by the forage harvester. The third mowing and intake arrangements 34 take up plants standing before them on the field, convey them to the outside and then inward along their rear sides until the plants are delivered to the second mowing and intake arrangement 32 in the convergent region. These third mowing and intake arrangements convey the plants along with the plants taken up by the second mowing and intake arrangement 32 itself along their forward sides until they are delivered to the first mowing and intake arrangement 22. The latter convey the plants so taken over together with the plants taken up on their forward side by the first mowing and intake arrangement 22 itself and convey them along their rear sides up to the delivery drums 30 which then deliver all plants to the rear into the intake channel. Accordingly the result is a flow of harvested crop without abrupt changes in direction. Since adjoining mowing and intake arrangements 22, 32, 34 in each case rotate in opposite directions and thereby support each other in their conveying effect on the flow of the harvested crop, a relatively gentle flow of the crop is created that avoids abrupt changes of direction.

Having described the preferred embodiment, it will become apparent that various modifications can be made without departing from the scope of the invention as defined in the accompanying claims.

The invention claimed is:

1. A machine for the harvest of stalk-like crop, with a frame that can be moved across a field in a forward operating direction, to which in each case at least three mowing and intake arrangements are attached, of which the first mowing and intake arrangements that is directly adjacent to the longitudinal center plane of the machine can be driven during the harvesting operation in such a way that their forward regions, as seen in the forward operating direction of the machine, move towards the outside and that the second mowing and intake arrangements, which follow the first mowing and intake arrangements to the outside, which can be driven during the harvesting operation in such a way that their forward regions as seen in the forward operating direction of the machine, move inward, so that the flows of harvested crop of the first and second mowing and intake arrangements in each case converge between them and can be delivered to a self-propelled forage harvester at the rear of the first mowing and intake arrangements and the third mowing and intake arrangement, which follows the second mowing and intake arrangement to the outside, are attached in such a way that they deliver the harvested crop taken up by them during the harvesting operation directly to the second mowing and intake arrangement, wherein the third mowing and intake arrangements can be driven during the harvesting operation in such a way that their forward regions, as seen in the forward operating direction of the machine, move towards the outside.

2. A machine according to claim 1, wherein the first, second and third mowing and intake arrangements include a rotating lower cutting disk and rotating conveyor disks arranged coaxially above them with recesses distributed about their circumferences to accept stalks of plants.

3. A machine according to claim 1, wherein the first and second mowing and intake arrangements are provided with a larger diameter than the third mowing and intake arrangements.

4. A machine according to claim 2, wherein the axes of rotation of all mowing and intake arrangements lie along a line.

5. A machine according to claim 1, wherein outer stalk lifting screw conveyors adjoin and are associated with at least one third mowing and intake arrangement which is provided with a conveying direction towards the rear.

6. A machine according to claim 1, wherein an adjoining lower divider point without any moving elements is rigidly connected to the frame and is associated with at least one third mowing and intake arrangement.

7. A machine according to claim 1, wherein an adjoining outer divider point is rigidly connected to the frame and is associated with at least one third mowing and intake arrangement and a transverse conveyor drum is associated with the rear region of the third mowing and intake arrangement.

8. A machine according to claim 7, wherein the transverse conveyor drum includes drivers which extend through slots provided in a rear wall of the frame.

9. A machine according to claim 4 wherein the mowing and intake arrangements lie along a line extending transverse to the forward operating direction and to the longitudinal center plane extending parallel to it and the center of the third mowing and intake arrangements is located further forward than that of the first and second mowing and intake arrangements.

* * * * *